(12) United States Patent
Kramer

(10) Patent No.: US 8,363,764 B2
(45) Date of Patent: Jan. 29, 2013

(54) METHOD AND DEVICE FOR RECONSTRUCTING A DATA CLOCK FROM ASYNCHRONOUSLY TRANSMITTED DATA PACKETS

(75) Inventor: Ronalf Kramer, Oberbiberg (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1416 days.

(21) Appl. No.: 11/834,433

(22) Filed: Aug. 6, 2007

(65) Prior Publication Data

US 2009/0041028 A1 Feb. 12, 2009

(51) Int. Cl.
*H04L 7/00* (2006.01)
(52) U.S. Cl. ........ 375/354; 375/316; 375/355; 375/358; 375/359; 375/362; 375/370; 375/371; 375/372; 375/375; 375/376; 370/503
(58) Field of Classification Search .......... 375/354–356; 370/235, 395.62, 500–503
See application file for complete search history.

(56) References Cited

U.S. PATENT DOCUMENTS

| | | | | |
|---|---|---|---|---|
| 6,128,357 A * | 10/2000 | Lu et al. | ............. | 375/355 |
| 7,570,182 B2 * | 8/2009 | Sheba et al. | ............. | 341/118 |
| 2002/0186804 A1 * | 12/2002 | Dorschky et al. | ............. | 375/376 |
| 2004/0062278 A1 * | 4/2004 | Hadzic et al. | ............. | 370/503 |
| 2004/0258099 A1 * | 12/2004 | Scott et al. | ............. | 370/503 |
| 2006/0013263 A1 | 1/2006 | Fellman | | |
| 2006/0056560 A1 * | 3/2006 | Aweya et al. | ............. | 375/356 |
| 2006/0291479 A1 * | 12/2006 | Sasson et al. | ............. | 370/395.62 |
| 2007/0041324 A1 * | 2/2007 | Shenoi | ............. | 370/235 |
| 2007/0242678 A1 * | 10/2007 | Fu et al. | ............. | 370/395.62 |

FOREIGN PATENT DOCUMENTS

WO WO 00/28666 5/2000

OTHER PUBLICATIONS

Meyer, P., et al., "The Future of Timing: The Transition to Packet Networks," Zarlink Semiconductor, Jan. 2007, pp. 1-6, Electronic Engineering and Product World.

* cited by examiner

*Primary Examiner* — David Ometz
*Assistant Examiner* — Eboni Hughes
(74) *Attorney, Agent, or Firm* — Slater & Matsil, L.L.P.

(57) ABSTRACT

For reconstructing a data clock from asynchronously transmitted data packets, a control loop is provided which includes a controlled oscillator. An input signal of the control loop is generated on the basis of the received data packets. At least one high-pass type filter is provided in a signal path of the control loop. The data clock for the synchronous output of data is generated on the basis of an output signal of the controlled oscillator.

40 Claims, 11 Drawing Sheets

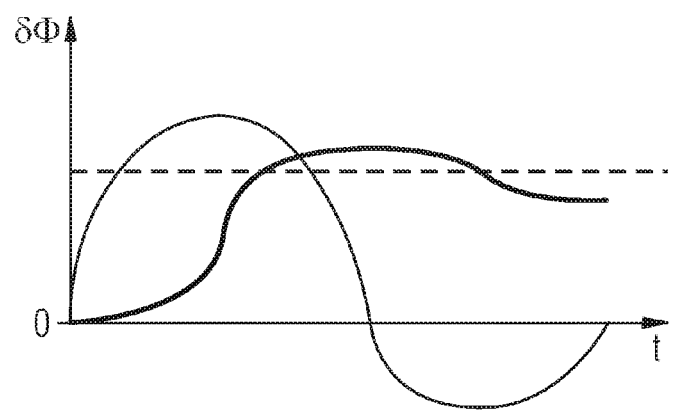
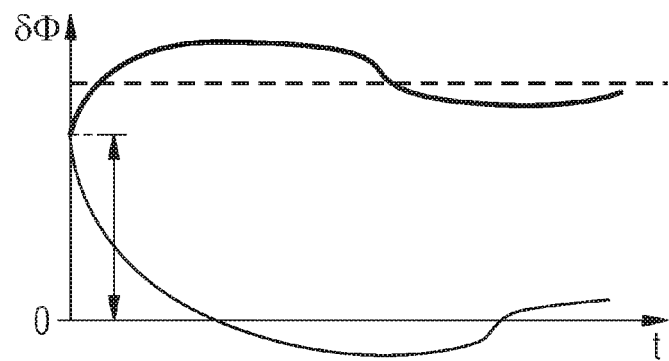

FIG 6

| SN | 1 | 2 | 3 | 4 | 5 | 7 | 8 | 9 | 10 |
|---|---|---|---|---|---|---|---|---|---|
| RP | 10 | 20 | 30 | 40 | 50 | 60 | 70 | 80 | 90 |
| FRP (A) | 10 | 10 | 10 | 10 | 10 | 10 | 10 | 10 | 10 |
| OP | 10 | 20 | 30 | 40 | 50 | 70 | 80 | 90 | 100 |
| FOP (B) | 10 | 10 | 10 | 10 | 10 | 20 | 10 | 10 | 10 |
| (A)-(B) | 0 | 0 | 0 | 0 | 0 | -10 | 0 | 0 | 0 |
| FSN (C) | 1 | 1 | 1 | 1 | 1 | 2 | 1 | 1 | 1 |
| (A)x(C) | 10 | 10 | 10 | 10 | 10 | 20 | 10 | 10 | 10 |
| (A)x(C)-(B) | 0 | 0 | 0 | 0 | 0 | 0 | 0 | 0 | 0 |

FIG 7

| SN | 1 | 5 | 3 | 2 | 6 | 4 | 9 | 7 | 8 | 10 | 11 |
|---|---|---|---|---|---|---|---|---|---|---|---|
| RP | 10 | 20 | 30 | 40 | 50 | 60 | 70 | 80 | 90 | 100 | 10 |
| FRP (A) | 10 | 10 | 10 | 10 | 10 | 10 | 10 | 10 | 10 | 10 | 10 |
| OP | 10 | 20 | 30 | 40 | 50 | 60 | 70 | 80 | 90 | 100 | 10 |
| FOP (B) | 10 | 10 | 10 | 10 | 10 | 10 | 10 | 10 | 10 | 10 | 10 |
| (A)-(B) | 0 | 0 | 0 | 0 | 0 | 0 | 0 | 0 | 0 | 0 | 0 |
| FSN (C) | 1 | 4 | -2 | -1 | 4 | -2 | 5 | -2 | 1 | 2 | 1 |
| (A)x(C) | 10 | 40 | -20 | -10 | 40 | -20 | 50 | -20 | 10 | 20 | 10 |
| (A)x(C)-(B) | 0 | 30 | -30 | -20 | 30 | -30 | 40 | -30 | 0 | 10 | 0 |

| SN | 1 | 5 | 3 | 2 | 4 | 9 | 7 | 8 | 10 | 11 |
|---|---|---|---|---|---|---|---|---|---|---|
| RP | 10 | 20 | 30 | 40 | 50 | 60 | 70 | 80 | 90 | 100 |
| FRP (A) | 10 | 10 | 10 | 10 | 10 | 10 | 10 | 10 | 10 | 10 |
| OP | 10 | 20 | 30 | 40 | 60 | 70 | 80 | 90 | 100 | 10 |
| FOP (B) | 10 | 10 | 10 | 10 | 20 | 10 | 10 | 10 | 10 | 10 |
| (A)-(B) | 0 | 0 | 0 | 0 | -10 | 0 | 0 | 0 | 0 | 0 |
| FSN (C) | 1 | 4 | -2 | -1 | 2 | 5 | -2 | 1 | 2 | 1 |
| (A)x(C) | 10 | 40 | -20 | -10 | 20 | 50 | -20 | 10 | 20 | 10 |
| (A)x(C)-(B) | 0 | 30 | -30 | -20 | 0 | 40 | -30 | 0 | 10 | 0 |

| SN | 1 | 5 | 3 | 2 | 4 | 9 | 7 | 8 | 10 | 11 |
|---|---|---|---|---|---|---|---|---|---|---|
| RP | 10 | 21 | 29 | 43 | 55 | 61 | 70 | 82 | 90 | 100 |
| FRP (A) | 10 | 11 | 8 | 14 | 12 | 6 | 9 | 12 | 8 | 10 |
| OP | 10 | 20 | 30 | 40 | 60 | 70 | 80 | 90 | 100 | 10 |
| FOP (B) | 10 | 10 | 10 | 10 | 20 | 10 | 10 | 10 | 10 | 10 |
| (A)-(B) | 0 | 1 | -2 | 4 | -8 | -4 | -1 | 2 | -2 | 0 |
| FSN (C) | 1 | 4 | -2 | -1 | 2 | 5 | -2 | 1 | 2 | 1 |
| (A)x(C) | 10 | 44 | -16 | -14 | 24 | 30 | -18 | 12 | 16 | 10 |
| (A)x(C)-(B) | 0 | 34 | -18 | -10 | 4 | 20 | -28 | 2 | 6 | 0 |

| SN | | 1 | 5 | 3 | 2 | 4 | 9 | 7 | 8 | 10 | 11 |
|---|---|---|---|---|---|---|---|---|---|---|---|
| RP | | 10 | 20 | 30 | 40 | 50 | 60 | 70 | 80 | 90 | 100 |
| FRP (A) | | 10 | 10 | 10 | 10 | 10 | 10 | 10 | 10 | 10 | 10 |
| FSN (C) | | 1 | 4 | -2 | -1 | 2 | 5 | -2 | 1 | 2 | 1 |
| (A)x(C) | | 10 | 40 | -20 | -10 | 20 | 50 | -20 | 10 | 20 | 10 |
| AC (A)x(C) | | 10 | 40 | 20 | -10 | 10 | 50 | 30 | 40 | 20 | 10 |
| REG4 (E) | | 10 | | 20 | | 10 | | | 40 | 20 | 10 |
| OP | 0 | 18 | | 36 | | 55 | | | 73 | 91 | 110 |
| FOP (B) | | 18 | | 18 | | 19 | | | 18 | 18 | 19 |
| (E)-(B) | | -8 | | 2 | | -9 | | | 22 | 2 | -9 |

METHOD AND DEVICE FOR RECONSTRUCTING A DATA CLOCK FROM ASYNCHRONOUSLY TRANSMITTED DATA PACKETS

TECHNICAL FIELD

The present invention generally relates to the reconstruction of a data clock from asynchronously transmitted data packets and provides corresponding methods and devices.

BACKGROUND

In synchronous data networks, a data clock is transmitted over the network from a source to all other instances in the network. An example for a synchronous network is a TDM network of the PDH hierarchy (TDM: time division multiplex; PDH: plesiochronous digital hierarchy). Further, it is known to transmit data via asynchronous networks, such as packet switched networks (PSNs). In particular, there is also the possibility to transmit synchronous data via asynchronously transmitted data packets, e.g., to transmit TDM data via a packet switched network. At transition points between TDM networks and PSM networks, inter-working functions (IWFs) are used to accomplish the conversion between the different network types. Generally, when transmitting synchronous data via asynchronously transmitted data packets, also a data clock of the synchronous data is propagated via the asynchronously transmitted data packets. This is typically accomplished by reconstructing the data clock from the asynchronously transmitted data packets.

One known approach of reconstructing the data clock is the adaptive method, in which the synchronous data are assembled into data packets and transmitted without transmitting additional time information via the asynchronous packet network. A receiver reconstructs the data clock by adaptation to an average reception data rate and controlling a phase-locked loop (PLL) to generate the reconstructed data clock.

Another known method of reconstructing a data clock is the differential method, in which timestamps are included into the transmitted data packets and are used for reconstructing the data clock in the receiver.

However, these known methods are sensitive to variations in the transit time of the data packets through the packet network, which also results in variations in the reconstructed data clock. These variations are also referred to as wander. Further, these known methods are sensitive to a loss of packets, which results in wander as well. For example, a loss of data packets may occur if the data packet has an excessively large transit time through the packet network, thereby arriving too late to be used at the receiving instance, if the data packet is found to be defective after reception, e.g., due to bit errors, and discarded at the receiving instance, or if the data packet is actually lost, i.e., never received from the packet network.

SUMMARY OF THE INVENTION

According to embodiments of the invention, methods and devices for reconstructing a data clock from asynchronously transmitted data packets are provided, in which high-pass type filtering is used in a signal path of a control loop for generating a data clock for synchronous output of data received via the data packets.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 schematically illustrates the effect of high-pass filtering as used according to an embodiment of the invention on the course of the phase error in case of typical disturbances;

FIG. 6 shows a table including exemplary values of characteristic parameters in a method of reconstructing a data clock according to an embodiment of the invention;

FIG. 7 shows a table including exemplary values of characteristic parameters in a method of reconstructing a data clock according to an embodiment of the invention;

DETAILED DESCRIPTION OF ILLUSTRATIVE EMBODIMENTS

The following detailed description explains exemplary embodiments of the present invention. The description is not to be taken in a limiting sense, but is made only for the purpose of illustrating the general principles of the invention. It is to be understood that the scope of the invention is only defined by the claims and is not intended to be limited by the exemplary embodiments described hereinafter.

In the following detailed description of exemplary embodiments any shown or described direct connection or coupling between functional blocks, devices, components, or other physical or functional units could also be implemented by indirect connection or coupling. Further, functions of the components could be implemented by hardware, by software, or by a combination thereof.

In the following, embodiments of the invention will be described with reference to the accompanying drawings. The embodiments described hereinafter relate to methods and devices for reconstructing a data clock from asynchronously transmitted data packets, the data packets containing data to be synchronously output on the basis of the reconstructed data clock. The data to be synchronously output, herein also referred to as synchronous data, may be TDM data, e.g., data transmitted via an E1/T1 connection. In other embodiments, other types of synchronous data and other types of asynchronous networks may be used. The description will focus on the functions as implemented in a receiving instance. However, it is to be understood that the described concepts may also be applied in bi-directional connections, in which a receiving instance at the same time has the function of a transmitting instance. The described functions may be part of an inter-working function for coupling a synchronous data connection to an asynchronous packet network.

Figure 1:
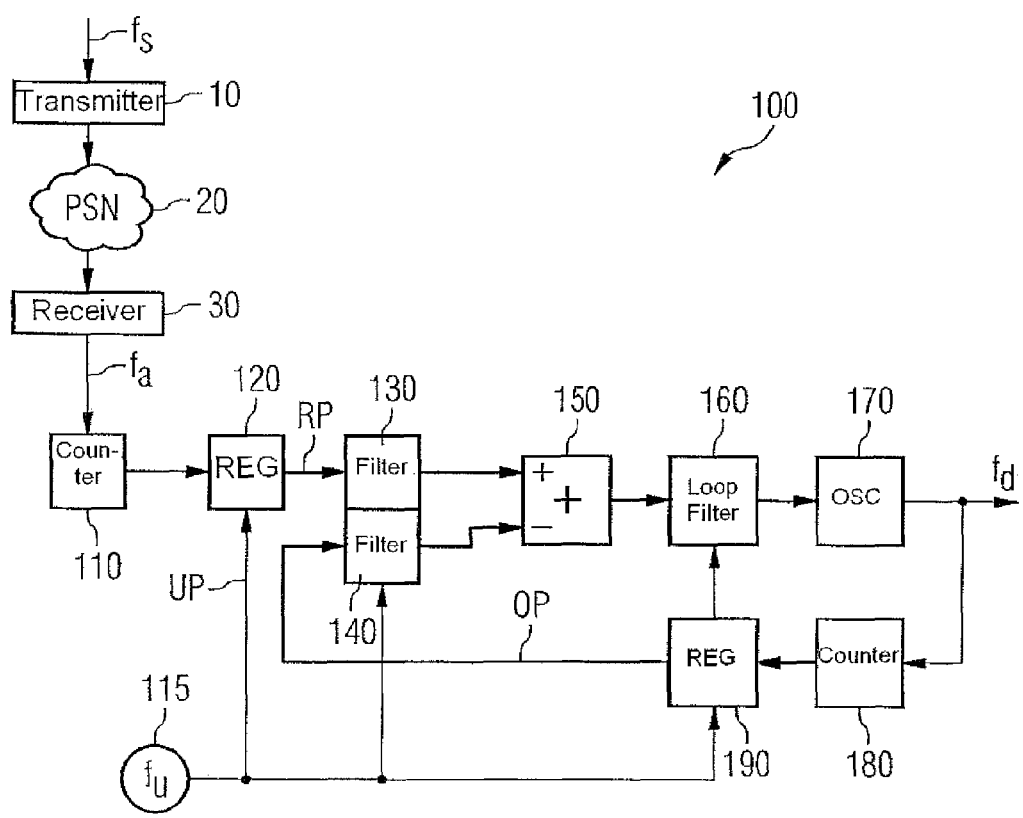
FIG. 1 schematically represents a device for reconstructing a data clock from asynchronously transmitted data packets according to an embodiment of the invention.

FIG. 1 schematically illustrates a device 100 for reconstructing a data clock from asynchronously transmitted data packets. Further illustrated is a transmitting instance 10, which assembles the synchronous data into data packets, a packet switched network (PSN) 20, and a receiver 30, which receives the asynchronously transmitted data packets from the PSN 20.

At the transmitting instance 10, a data clock frequency of the synchronous data to be transmitted is denoted by $f_s$. The receiver 30 receives the synchronous data at a reception data rate $f_a$.

The device 100 reconstructs the data clock of the synchronous data from the asynchronously transmitted data packets. According to the illustrated embodiment, this is accomplished on the basis of the reception data rate $f_a$. The device 100 comprises a first counter 110, which counts the amount of the received synchronous data. According to the illustrated embodiment, this is accomplished by counting the number of data bits. However, it is to be understood that the amount of data could also be counted in other units, e.g., on the basis of bytes or the like.

The value of the first counter 110 is supplied to a first register 120, in which the value of the first counter 110 is stored at regular time intervals. For this purpose, an update pulse signal UP is supplied to the first register 120. The update pulse signal UP is generated by an update pulse generator 115 and has a frequency $f_u$.

The first register 120 thus outputs a data reception progress signal RP, which is updated at regular time intervals. The data reception progress signal RP represents the amount of received synchronous data.

The data reception progress signal RP is supplied to a control loop for generating a data clock for synchronously outputting the received synchronous data, i.e., the reconstructed data clock. The control loop substantially corresponds to a phase-locked loop (PLL) and comprises a controlled oscillator 170, which generates the reconstructed data clock. In FIG. 1, the frequency of the reconstructed data clock is denoted by $f_d$. The reconstructed data clock is supplied to a feedback path of the control loop, the feedback path comprising a second counter 180 and a second register 190. The function of the second counter 180 and of the second register 190 is similar to the first counter 110 and the first register 120. However, as the reconstructed data clock is supplied to the second counter 180, the output of the second register 190 is representative of the amount of output synchronous data. Accordingly, the output of the second register 190 is referred to as data output progress signal OP. The second register 190 is supplied with the update pulse signal UP as well, i.e., the data output progress signal is updated at the same time intervals as the data reception progress signal RP.

On the basis of the data reception progress signal RP and the data output progress signal OP, a difference signal is generated in a combination stage 150 of the control loop. The difference signal is supplied to a loop filter 160 of the control loop. The loop filter 160 typically has low-pass characteristics.

As further illustrated, the control loop comprises a first high-pass type filter 130 which receives the data reception progress signal RP and generates a filtered data reception progress signal, which is supplied to the combination stage 150. Further, the control loop comprises a second high-pass type filter 140, which receives the data output progress signal OP and supplies a filtered data output progress signal to the combination stage 150. In the combination stage 150, the difference signal is generated by subtracting the filtered data output progress signal from the filtered data reception progress signal. The control loop generally has the function of controlling the difference between the reception data rate $f_a$ and the frequency of the reconstructed data clock $f_d$ to zero.

It is to be noted that both the first counter 110 and the second counter 180 are provided with an overflow-function so as to prevent an excessive increase of the counter value. That is to say, if the counter value exceeds a predetermined overflow threshold, it is reduced by subtracting a value corresponding to the overflow threshold. This is equivalent to a modulo operation.

According to an embodiment, the first high-pass type filter 130 and the second high-pass type filter 140 are implemented as first order filters having a transfer function of the type $H(z)=1-z^{-1}$. Such a filter may be implemented by calculating the filtered value as the difference between the present input value and the previous input value of the filter. That is to say, if the input values of the filter are denoted by V(i), i denoting the number of the value in the sequence of values, the filtered values FV(i) may be obtained according to $$FV(i+1)=V(i+1)-V(i).$$

The above-described control loop, which involves high-pass type filtering in a signal path of both the data reception progress signal RP and the data output progress signal OP, reduces the sensitivity of the control loop with respect to variations in the packet transit time and with respect to lost packets. A variation in the packet transit time will cause equally sized positive and negative variations in the filtered data reception progress signal shortly after each other, which means that there is no resulting change in the frequency of the reconstructed data clock. Further, even short time variations in the frequency of the reconstructed data clock, which may also be referred to a jitter, are absorbed due to the overall filtering characteristic of the control loop. In case of lost data packets, there is only a temporary change in the filtered data reception progress signal, which means that there will be no persistent change in the control signal of the controlled oscillator. Accordingly, wander of the reconstructed data clock is significantly reduced.

In the illustrated embodiment, the control loop is not sensitive with respect to a constant phase difference. Rather, the control loop is substantially sensitive only with respect to frequency differences. A phase difference may for example be present at the beginning of a data transmission. The insensitivity with respect to phase differences significantly speeds up tuning in of a control loop at the beginning of a transmission.

According to an embodiment, the high-pass type filters may also implement an overflow processing. That is to say, it may be taken into account within the filtering process whether an overflow has occurred in the counter generating the input signal of the filter. An overflow can be detected by monitoring the input values of the filter. If the new input value is smaller than the previous input value, this indicates that an overflow has occurred. In this case, the above-mentioned implementation of the filter may be modified so as to calculate the filtered value according to:

$$FV(i+1)=V(i+1)+OV-V(i),$$

wherein OV is the threshold value above which the overflow occurs.

In this case, the combination stage can be supplied with filtered signals which are not influenced by overflow events, which allows for a simple structure of the combination stage.

The high-pass type filters 130, 140 are operated on the basis of the update pulse signal as well, which means that the filtered output signals are updated at regular time intervals just as the first and second registers 110, 180.

Figure 2A:
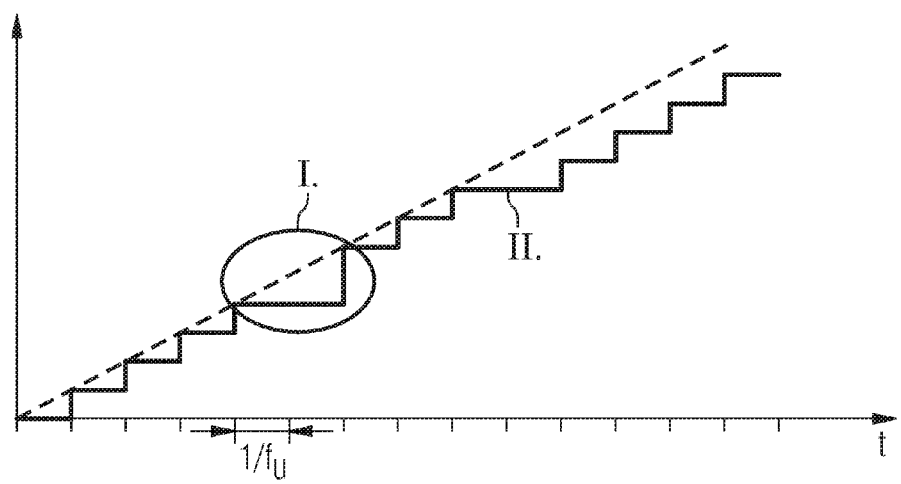
FIG. 2 schematically illustrates the course of a data reception progress signal and of a filtered data reception progress signal as used in a method of reconstructing a data clock according to an embodiment of the invention.

FIG. 2(a) schematically illustrates an exemplary course of the data reception progress signal RP. The course of the data reception progress signal RP is shown as a solid line. For comparison, the values of the second counter 190 are illustrated as a dashed line. The course of these counter values generally corresponds to the course of the data output progress signal OP, but does not have step like jumps, which are due to the regular updating of the register 190 on the basis of the update pulse signal UP.

At I., the effect of a variation in the packet transit time is illustrated. In the data reception progress signal RP, a constant value is maintained for a longer time since no further packet has arrived in this interval. With the next update pulse, the delayed packet and the next packet have arrived, which causes the data reception progress signal to increase by an amount corresponding to two data packets.

At II., the effect of a lost data packet is illustrated. In this case, the value of the data reception progress signal RP remains unchanged after the usual update interval and then continues to increase again as the next data packets are received. However, as illustrated, there remains a constant offset between the course of the values in the second counter 180 and the data reception progress signal RP.

Figure 2B:
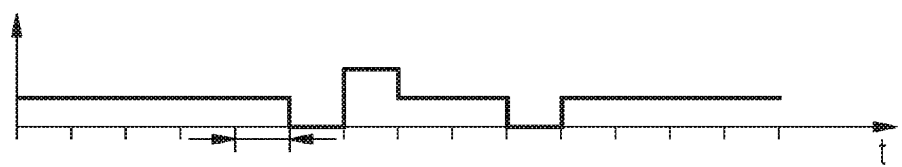

In FIG. 2(b), the course of the corresponding filtered data reception progress signal is illustrated. As illustrated, in the region of the variation in the packet transit time, there is a negative change followed by a positive change in the filtered data reception progress signal. In the control signal of the controlled oscillator 170, which is generated on the basis of the filtered data reception progress signal, there is no net effect of these two consecutive changes, as they cancel out each other.

At the position of the lost data packet, there is a temporary change in the filtered data reception progress signal, which again causes no persistent change in the control signal of the controlled oscillator 170.

Figure 3A:
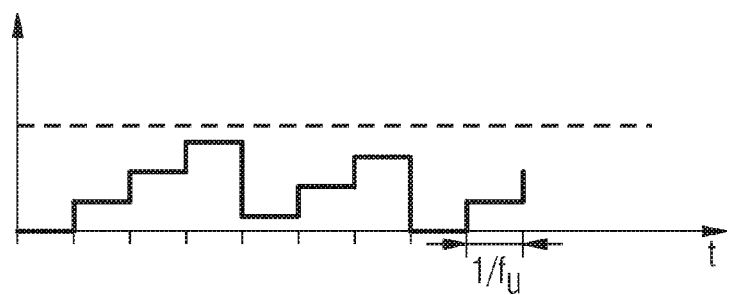
FIG. 3 schematically illustrates the course of a data reception progress signal in case of overflow events and the corresponding filtered data reception progress signal which is subjected to an overflow processing according to an embodiment of the invention.
Figure 3B:
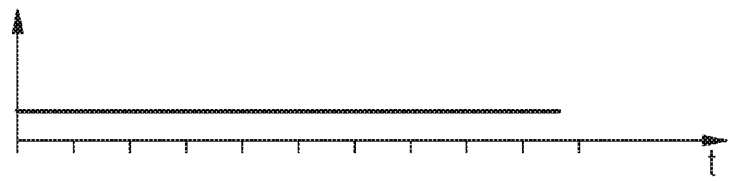

FIG. 3 schematically illustrates the course of the data reception progress signal RP or of the data output progress signal OP in case of overflow events. The solid line represents an exemplary course of the data reception progress signal RP or of the data output progress signal OP. A dashed line illustrates the overflow threshold. As mentioned above, if the first counter 110 or the second counter 180 exceeds the overflow threshold, the counter value is reduced by subtracting a value corresponding to the overflow threshold. This causes the data reception progress signal RP or the data output progress signal OP to be reduced as well. According to an embodiment, this can be used within the filters 130, 140 to detect whether an overflow has occurred. If an overflow has occurred, the overflow threshold value is added to the respective filtered value. This results in a course of the filtered data reception progress signal or of the filtered data output progress signal as illustrated in FIG. 3(b). As can be seen, an overflow has no effect on the filtered output signal.

FIG. 4 schematically illustrates the effect of typical disturbances on the course of a phase error in the control loop. In both FIG. 4(a) and FIG. 4(b), a thick solid line represents the course of the phase error $\delta\Phi$ with a control loop as illustrated in FIG. 1. For the sake of comparison, a thin solid line illustrates the course of the phase error $\delta\Phi$ without the high-pass type filters 130, 140 in the control loop. A dashed line in each case illustrates an asymptotic value the phase error $\delta\Phi$ approaches when using the high-pass type filters as described above. Without these filters, the phase error $\delta\Phi$ eventually vanishes, i.e. would be controlled to zero.

FIG. 4(a) illustrates the scenario of a frequency jump at the input of the control loop, i.e., a frequency difference which suddenly occurs between the data reception rate $f_a$ and the frequency of the reconstructed data clock $f_d$.

FIG. 4(b) illustrates the case of a phase jump at the input of the control loop, i.e., a suddenly occurring phase difference between the data reception rate $f_a$ and the frequency of the reconstructed data clock $f_d$.

In both cases, the use of the high-pass type filters 130, 140 allows for a persistent phase difference which is not compensated by the control loop. As compared to that, without the high-pass type filters, the phase error $\delta\Phi$ is eventually controlled to zero.

In general, the course of the phase difference in case of the control loop having the high-pass type filters corresponds to the integral of the course of the phase error in the control loop without the high-pass type filters. This may also be expressed in terms of the phase transfer function of the control loop: If $H_0(z)$ is the phase transfer function of the control loop without the high-pass type filters, the phase transfer function of the control loop having the high-pass type filters can be expressed as $$H(z)=H_0(z)\cdot 1/(1-z^{-1}).$$

Figure 5:
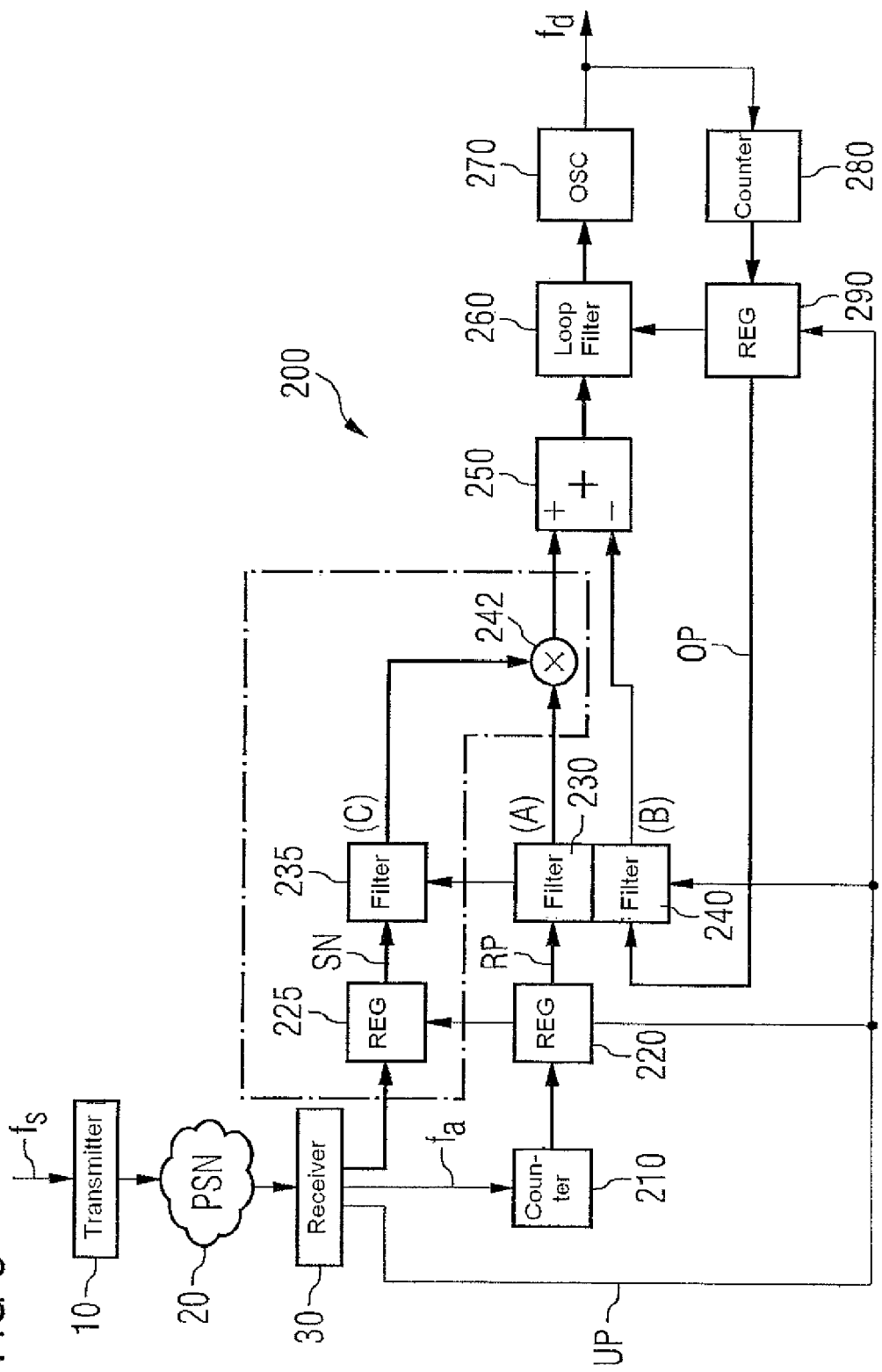
FIG. 5 schematically illustrates a device for reconstructing a data clock from asynchronously transmitted data packets according to a further embodiment of the invention.

FIG. 5 schematically illustrates a device 200 for reconstructing a data clock from asynchronously transmitted data packets. The operation of the device 200 is generally similar to that of the device 100 as illustrated in FIG. 1. In FIG. 5, components which correspond to those of FIG. 1 have been designated with the same reference signs, and will not be further explained in the following.

As illustrated, the device 200 comprises a first counter 210 which generally corresponds to the first counter 110 of FIG. 1, a first register 220 which generally corresponds to the first register 120 of FIG. 1, a first high-pass type filter 230, and a second high-pass type filter 240 which generally correspond to the high-pass type filters 130, 140 of FIG. 1, respectively, a combination stage 250 which generally corresponds to the combination stage 150 of FIG. 1, a loop filter 260 which generally corresponds to the loop filter 160 of FIG. 1, a controlled oscillator 270 which generally corresponds to the controlled oscillator 170 of FIG. 1, a second counter 280 which generally corresponds to the second counter 180 of FIG. 1, and a second register 290 which generally corresponds to the second register 190 of FIG. 1.

The following discussion will focus on the differences of the device 200 as compared to the device 100.

In addition to the components of the device 100, the device 200 comprises a third register 225 and a third high-pass type filter 235. The third register 225 is configured to store sequence numbers extracted from the received data packets. The sequence numbers are extracted by a correspondingly configured extraction stage of the receiver 30. In other implementations, the extraction stage could also be provided as a separate component.

The third register 225 provides at its output a sequence number signal SN which is supplied to the third high-pass type filter 235. The third high-pass type filter 235 provides at its output a filtered sequence number signal. The third high-pass type filter 235 may be implemented as explained above for the first and second high-pass type filters 230, 240. In particular, the third high-pass type filter 235 may also include the overflow processing as explained above. In FIG. 5, the filtered sequence number signal is denoted with (C). The filtered data reception progress signal is denoted by (A), and the filtered data output progress signal is denoted by (B).

The filtered data reception progress signal (A) and the filtered sequence number signal (C) are supplied to a multiplication stage 242, which is configured to provide an output signal corresponding to the value of the filtered data reception progress signal (A) multiplied by the filtered sequence numbers signal (C). This output signal is supplied to the combination stage 250, where the difference signal is obtained by subtracting the filtered data output progress signal from the output signal of the multiplication stage 242.

As a further difference as compared to the device 100 of FIG. 1, the receiver 30 is also configured to generate the update pulse signal UP on the basis of the received data packets. In particular, an update pulse is generated each time a new data packet is received. Accordingly, the first, second and third registers 220, 290, 225 and the first, second and third high-pass type filters 230, 240, 235 are updated upon reception of a new data packet.

The function of the third register 225, the third high-pass type filter 235 and the multiplication stage 242 (the block enclosed by a dashed line in FIG. 5) may generally be described as the conversion of actual values of the data reception progress signal RP (influenced by the packet losses) into nominal values (without influence of packet losses). In this way, the effect of packet losses is further reduced. In the following, this will be explained in more detail by referring to exemplary values of characteristic parameters when reconstructing a data clock using the device 200.

FIG. 6 shows exemplary values of characteristic parameters when reconstructing a data clock using the device 200 as illustrated in FIG. 5. The first column contains the designations of the characteristic parameters. The further columns represent the development of these parameters as a function of time as further data packets are received.

In the first row, the sequence number signal SN is shown. As illustrated, the sequence number signal SN increases with each received data packet. However, a data packet having the sequence number 6 is missing. For example, this data packet may have been lost due to an excessively large transit time through the packet network, may have been discarded due to bit errors, or many have never been received from the packet switched network.

In the second row, the data reception progress signal RP is shown. As can be seen, the data reception progress signal increases by the number of synchronous data bits included in each data packet, in the illustrated example ten data bits.

In the third row, the filtered data reception progress signal is shown and designated by FRP (A). This parameter corresponds to the signal (A) of FIG. 5. As can be seen, the filtered data reception progress signal FRP (A) has a value of ten for each received data packet, which corresponds to the number of synchronous data bits included in the data packets.

In the fourth row, the data output progress signal OP is shown. As can be seen, the data output progress signal OP increases by ten with each received data packet, similar to the data reception progress signal RP. However, after the missing data packet, there is a larger increase, which is due to the fact that the synchronous data are continuously output even if no data packets are received or if the received data packets are subjected to a delay.

In the fifth row, the filtered data output progress signal is shown and designated by FOP (B). This parameter corresponds to the signal (B) of FIG. 5. As can be seen, the filtered data output progress signal FOP (B) generally assumes a value of ten, which corresponds to the number of synchronous data bits included in the received data packets. However, after the lost data packet, the filtered data output progress signal temporarily assumes an increased value.

In the sixth row, the difference between the filtered data reception progress signal FRP (A) and the filtered data output progress signal FOP (B), i.e., the difference signal (A)−(B), is shown. As can be seen, unless there is a loss of the data packet, this difference signal assumes a value of zero.

In the seventh row, the filtered sequence number signal is shown and designated by FSN (C). This parameter corresponds to the signal (C) of FIG. 5. As can be seen, the filtered sequence number signal FSN (C) assumes a value of one, unless a loss of a data packet occurs. In this case, the filtered sequence number signal FSN (C) temporarily assumes an increased value.

In the eighth row, the product signal (A)×(C) is shown. This parameter corresponds to the output signal of the multiplication stage 242 of FIG. 5. As can be seen, this parameter generally assumes a value of ten, which corresponds to the number of synchronous data bits included in each data packet, unless a loss of a data packet occurs. In this case, the product signal temporarily assumes an increased value. This temporary increase corresponds to the expected behavior of the filtered data output progress signal in case of a data packet loss. Accordingly, the product signal (A)×(C) is useful for compensating the effect of lost data packets in the filtered data output progress signal.

In the last row, the combination signal (A)×(C)−(B) is shown. This parameter corresponds to the output signal of the combination stage 250 of FIG. 5. As can be seen, this signal assumes a value of zero even in the case of lost data packets. That is to say, if this combination signal (A)×(C)−(B) is used as a basis for generating the control signal for the controlled oscillator 270, the loss of data packets does not influence the stability of the reconstructed data clock. As compared to that, in case of using the difference signal (A)−(B) as the basis for controlling the reconstructed data clock, which corresponds to the situation as present in the device of FIG. 1, there is a temporary change in the difference signal which is used as the basis for controlling the reconstructed data clock. However, in both cases there is no persistent change in the control signal which is supplied to the controlled oscillator 270 to generate the reconstructed data clock.

FIG. 7 shows further exemplary values of characteristic parameters in a method for reconstructing a data clock using the device as illustrated in FIG. 5. The designations in FIG. 7 correspond to that of FIG. 6. As compared to FIG. 6, the exemplary situation of FIG. 7 involves no loss of a data packet. However, in an interval as shown by the dashed vertical lines and the horizontal double-headed arrow, the data packets are not received in their original order as indicated by their sequence numbers.

In the situation of FIG. 7, as there is no loss of a data packet, both the data reception progress signal RP and the data output progress signal OP continuously increase by ten, which is the number of synchronous data bits included in each data packet, with each data packet. The difference signal (A)–(B) remains at a value of zero.

The effect of the data packets being received out of their original order can be seen in the filtered sequence number signal FSN (C), the product signal (A)×(C), and in the combination signal (A)×(C)–(B). The values of these signals vary in accordance with the displacement of the data packets from their original position.

As can be seen, the combination signal (A)×(C)–(B) sums up to zero over the interval of disordered data packets. That is to say, the sum of the combination signal (A)×(C)–(B) over this interval is zero, which means that there is no net effect on the control of the frequency of the reconstructed data clock. Accordingly, wander of the reconstructed clock is avoided. Jitter of the reconstructed data clock due to the short term variations in the combination signal (A)×(C)–(B) can be absorbed by the filter characteristics of the control loop.

Figure 8:
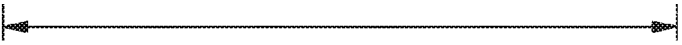
FIG. 8 shows a table including exemplary values of characteristic parameters in a method of reconstructing a data clock according to an embodiment of the invention.

FIG. 8 shows further exemplary values of characteristic properties in a method of reconstructing a data clock using the device of FIG. 5. The exemplary situation of FIG. 8 generally corresponds to that of FIG. 7, and again the designations are as explained in connection with FIG. 6. As compared to the exemplary situation of FIG. 7, in the exemplary situation of FIG. 8 there is also a loss of a data packet. In particular, the data packet having the sequence number 6 is missing. For example, it may have been lost due to an excessive transit time through the packet network, may have been discarded due to bit errors, or may have never been received from the packet switched network. The effects of the lost data packet on the data reception progress signal RP, the filtered data reception progress signal FRP (A), the data output progress signal OP, the filtered data output progress signal FOP (B), and the difference signal (A)–(B) are as explained in connection with FIG. 6. That is to say, the lost data packet causes a temporary variation in the difference signal (A)–(B).

The effect of the data packets being received out of their original order is again visible in the filtered sequence numbers signal SN, the product signal (A)×(C) and the combination signal (A)×(C)–(B). These signals vary in accordance with the displacement of the data packets from their original positions. In the last row, it can be seen that the combination signal (A)×(C)–(B) again sums up to zero over the interval of disordered data packets. Accordingly, there is no net effect on the control of the frequency of the reconstructed data clock, i.e., no wander of the reconstructed data clock. A resulting jitter of the reconstructed data clock due to the disordered data packets can be absorbed by the filter characteristics of the control loop.

Figure 9:
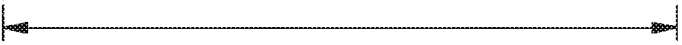
FIG. 9 shows a table including exemplary values of characteristic parameters in a method of reconstructing a data clock according to an embodiment of the invention.

FIG. 9 shows exemplary values of characteristic parameters in a method of reconstructing a data clock using the device of FIG. 5. The exemplary situation of FIG. 9 generally corresponds to that of FIG. 8. However, as compared to the previously explained exemplary situations, in the situation of FIG. 9 the number of synchronous data bits included in each data packet varies from packet to packet. The effect of this variation is best seen in the values of the data reception progress signal RP and the filtered data reception progress signal FRP (A). The effect of these variations is also reflected in the difference signal (A)–(B) and the combination signal (A)×(C)–(B). With regard to the reconstructed data clock, these variations tend to cause jitter of the reconstructed data clock, which can be absorbed by the filter characteristics of the control loop. Still, similar as in the previously explained situations, a loss of a data packet will only result in a temporary change of the difference signal (A)–(B), which means that there will be no significant wander of the reconstructed data clock if the control is accomplished on the basis of the difference signal. The values of the combination signal (A)×(C)–(B) no longer sums up to zero over the interval of disordered data packets. Nonetheless, the effect of lost data packets on the control of the reconstructed data clock is still small so that wander of the reconstructed data clock is effectively avoided.

As can be seen from the above-mentioned examples, both the difference signal (A)–(B), which is used as the basis for controlling the reconstructed data clock in the device of FIG. 1, and the combination signal (A)×(C)–(B), which is used as the basis for controlling the reconstructed data clock in the device of FIG. 5, result in the effect of lost data packets and disordered data packets on the frequency of the reconstructed data clock being significantly reduced. In particular, wander of the reconstructed data clock is avoided.

Figure 10:
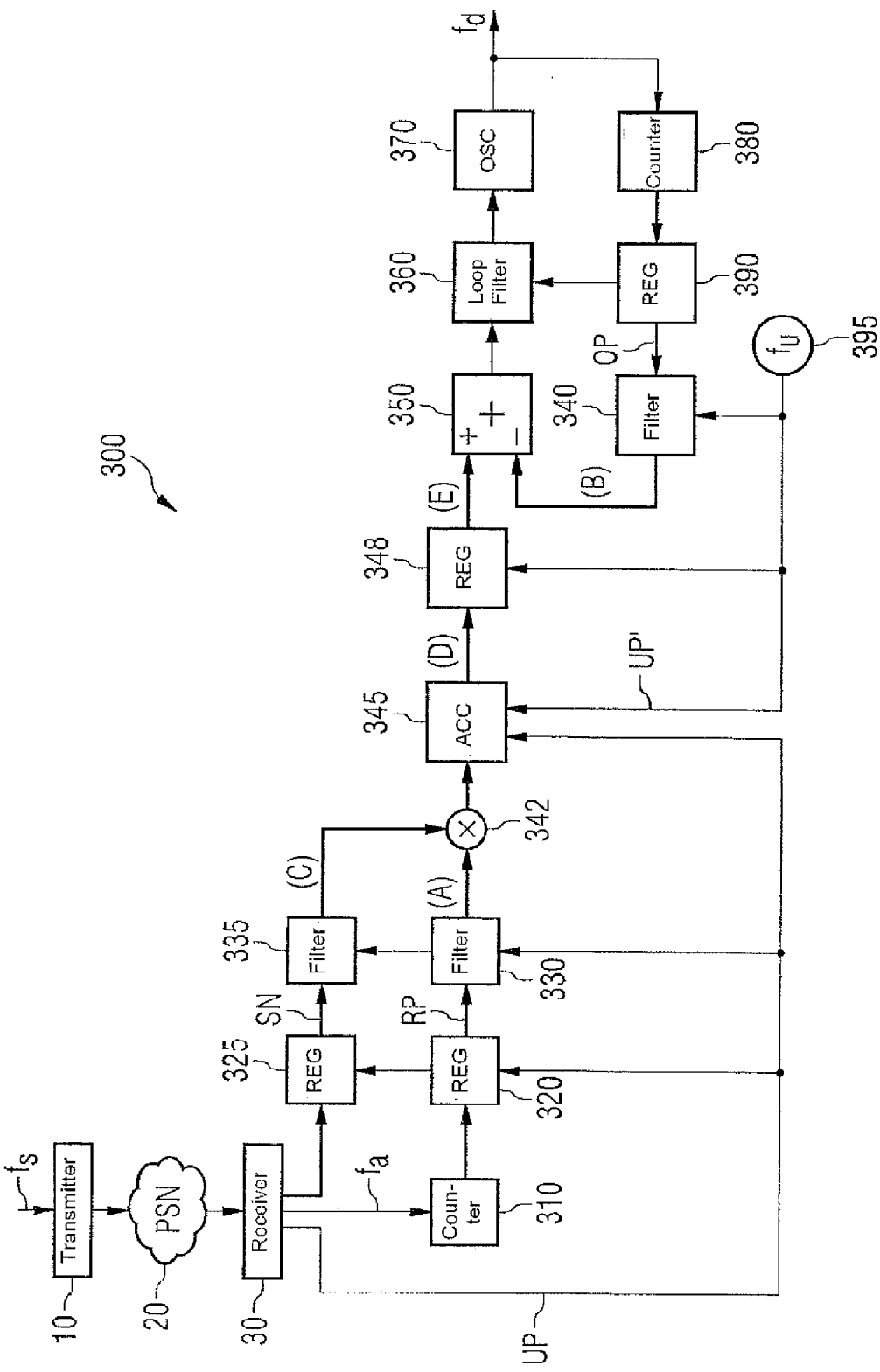
FIG. 10 schematically illustrates a device for reconstructing a data clock from asynchronously transmitted data packets according to a further embodiment of the invention.

FIG. 10 schematically illustrates a device for reconstructing a data clock from asynchronously transmitted data packets according to a further embodiment of the invention. In FIG. 10, components which correspond to those of FIG. 5 have been designated with the same reference numerals, and further description thereof will be omitted.

The device 300 illustrated in FIG. 10 generally corresponds to the device 200 of FIG. 5. In particular, the device 300 comprises a first counter 310 which corresponds to the first counter 210 of FIG. 5, a first register 320 which corresponds to the first register 220 of FIG. 5, and a first high-pass type filter 330 which corresponds to the first high-pass type filter 230 of FIG. 5. Further, the device 300 comprises a loop filter 360 corresponding to the loop filter 260 of FIG. 5, a controlled oscillator 370 corresponding to the controlled oscillator 270 of FIG. 5, a second counter 380 corresponding to the second counter 280 of FIG. 5, a second register 390 corresponding to the second register 290 of FIG. 5, and a second high-pass type filter 340 corresponding to the second high-pass type filter 240 of FIG. 5. The device 300 also comprises a third register 325 corresponding to the third register 225 of FIG. 5 and a third high-pass type filter 335 corresponding to the third high-pass type filter 235 of FIG. 5.

Further, the device 300 also comprises a multiplication stage 342 which corresponds to the multiplication stage 242 of FIG. 5.

As in FIG. 5, the output signal of the first high-pass type filter 330, i.e., the filtered data reception progress signal, is denoted by (A), the output signal of the second high-pass type filter 340, i.e., the filtered data output progress signal, is denoted by (B), and the output signal of the third high-pass type filter 335, i.e., the filtered sequence numbers signal, is denoted by (C). As can be seen, the signals (A), (B), and (C) are generated as described for the corresponding signals in the embodiment of FIG. 5.

However, as compared to the embodiment of FIG. 5, the device 300 further comprises an accumulator stage 345 which receives the output signal of the multiplication stage 342. The accumulator stage 345 is configured to accumulate its input signal over frames of multiple data packets. At the beginning of a frame, the accumulator stage 345 is reset to zero. Then, the accumulator stage 345 accumulates the output signal of the multiplication stage 342, i.e., the values of the product signal (A)×(C). The end of a frame is indicated by an update pulse signal UP'. The update pulse signal UP' is generated by an update pulse signal generator 395, which generates the update pulse signal UP' with a frequency $f_U$. Accordingly, update pulses are generated at regular time intervals of $1/f_U$.

The output signal of the accumulator stage 345 is supplied to a fourth register 348. The output signal of the fourth register 348 is supplied to a combination stage 350. In FIG. 10, the output signal of the accumulator stage 345, i.e., the accumulated product signal, is denoted by (D), and the output signal of the fourth register 348 is denoted by (E). The combination stage 350 is configured to generate a difference signal by subtracting the signal (B), i.e., the filtered data output progress signal, from the signal (E). The difference signal is used as a basis for generating a control signal of the controlled oscillator 370, by supplying the difference signal to the controlled oscillator 370 via the loop filter 360.

In the device 300, the first register 320, the third register 325, the first high-pass type filter 330, and the third high-pass type filter 335 are updated each time a new data packet is received. For this purpose, a corresponding update pulse signal UP is supplied from the receiver 30 to the first register 320, the third register 325, the first high-pass type filter 330 and the third high-pass type filter 335. This is similar to the device 200 of FIG. 5. Further, this update pulse signal UP is supplied to the accumulator stage 345 and used as a basis for updating the signal input of the accumulator stage 345.

The second register 390, the second high-pass type filter 340, and the fourth register 348 are updated on the basis of the update pulse signal UP' which comprises regularly spaced update pulses. The update pulse signal UP' is further supplied to the accumulator stage 345 so as to be used as a basis for updating the output signal of the accumulator stage 345. According to an embodiment, the frequency of the update pulse signal UP' is selected so as to be smaller than the average frequency at which data packets are received by the receiver 30.

By means of the accumulator stage 345, the control loop comprising the combination stage 350, the control loop for generating the reconstructed data clock can be updated at regular time intervals. This improves the stability of the control loop, e.g., by reducing the risk of unlocking.

Figures 11, 12:
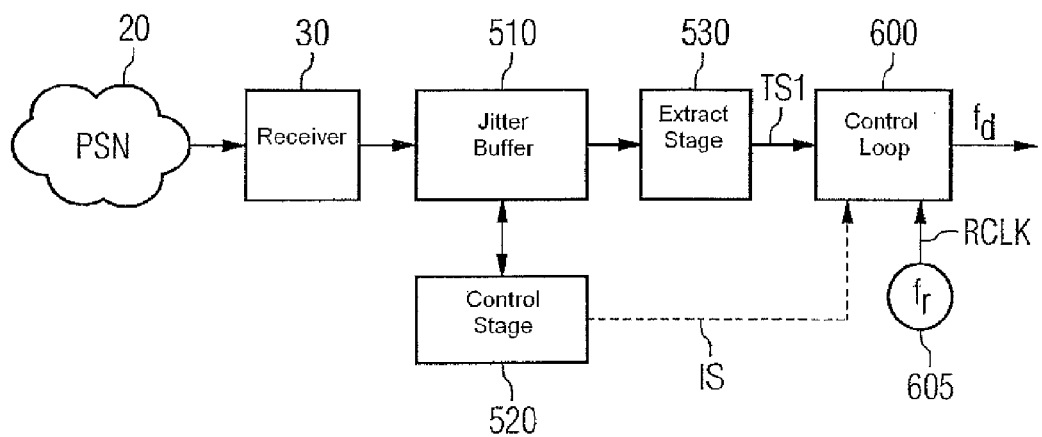
FIG. 11 shows a table including exemplary values of characteristic parameters in a method of reconstructing a data clock according to an embodiment of the invention.
FIG. 12 schematically illustrates a device for reconstructing a data clock from asynchronously transmitted data packets according to a further embodiment of the invention.

FIG. 11 shows exemplary values of characteristic parameters in a method of reconstructing a data clock using the device 300 as illustrated in FIG. 10. In FIG. 11, the above-mentioned frames are visualized by means of vertical dashed lines. The exemplary situation of FIG. 11 generally corresponds to that as illustrated in FIG. 8, i.e., packets are received out of their original order and the data packet having the sequence number 6 is lost.

Again, the first three rows show the sequence number signal SN, the data reception progress signal RP, and the filtered data reception progress signal FRP (A), respectively. The fourth and fifth rows show the filtered sequence numbers signal FSN (C) and the product signal (A)×(C). The values of these parameters are as explained in connection with FIG. 8.

The sixth row shows the accumulated product signal, i.e., the output signal of the accumulator stage 345 in FIG. 10. This signal is denoted by AC(A)×(C). This parameter corresponds to the signal (D) of FIG. 10.

The seventh row shows the value of the fourth register 348 and is denoted by REG4 (E). This parameter corresponds to the signal (E) of FIG. 10. As can be seen, the value of the signal (E) is updated at the end of each frame.

The eighth row shows the data output progress signal OP. As can be seen, the value of the data output progress signal increases at the end of each frame. As updating of the data output progress signal OP is no longer aligned with the reception of data packets and the updating of the data reception progress signal RP, the values of the data output progress signal OP may differ from the values of the data reception progress signal RP at the end of the frame.

The ninth row shows the filtered data output progress signal and is denoted by FOP (B). This parameter corresponds to the signal (B) of FIG. 10. As can be seen, the signal (B) assumes approximately the same value after each update and is subjected to only slight variations. The value of the signal (B) substantially corresponds to the average number of synchronous data bits in a frame.

The tenth row shows the difference signal (E)–(B) as available at the output of combination stage 350 in FIG. 10. The difference signal (E)–(B) is subjected to slight variations, but the sum of the difference signal (E)–(B) over an interval of six frames, as indicated by the double-headed arrow, is zero. The variations in the difference signal (E)–(B) tend to cause jitter of the reconstructed data clock, but no wander. According to an embodiment, this remaining jitter may be absorbed by the filtering characteristics of the control loop.

FIG. 12 schematically illustrates a device for reconstructing a data clock from asynchronously received data packets according to a further embodiment of the invention. As compared to the above-described embodiments of FIGS. 1, 5 and 10, the embodiment of FIG. 12 involves reconstruction of the data clock on the basis of timestamps included in the received data packets. Again, in FIG. 12 the packet switched network is denoted by 20, and a receiver for receiving the data packets is denoted by 30. The timestamps are incorporated into the data packets upon transmission and indicate the linear progress of time in relation to the synchronous data transmitted with the data packets.

According to the illustrated embodiment, the device includes a jitter buffer 510 for buffering the received data packets. The jitter buffer 510 is useful to compensate for variations in the packet transit time through the packet switched network 20. Furthermore, the jitter buffer 510 is configured to accomplish reordering of the data packets according to their original order, i.e., as transmitted into the packet switched network 20.

The device further comprises a timestamp extraction stage 530, which is configured to extract timestamps from the received data packets. Via a first timestamp signal TS1, the timestamps are supplied to a device 600 for reconstructing the data clock on the basis of the received timestamps. The device 600 is supplied with a reference clock signal RCLK, which is generated by a reference clock generator 605. The frequency of the reference clock signal RCLK is denoted by $f_r$. A reference clock signal having the same frequency $f_r$ is used in the transmitter (not shown) for generating the timestamps.

According to the embodiment, the device further comprises a control stage 520 configured to control the size of the jitter buffer 510. The control of the buffer size is accomplished by adding or deleting data packets. As further illustrated, the control stage 520 is configured to generate an indication signal IS in case of adding or deleting a data packet from the jitter buffer 510. The indication signal IS is supplied to the device 600 to be used in the process of reconstructing the data clock.

Figure 13:
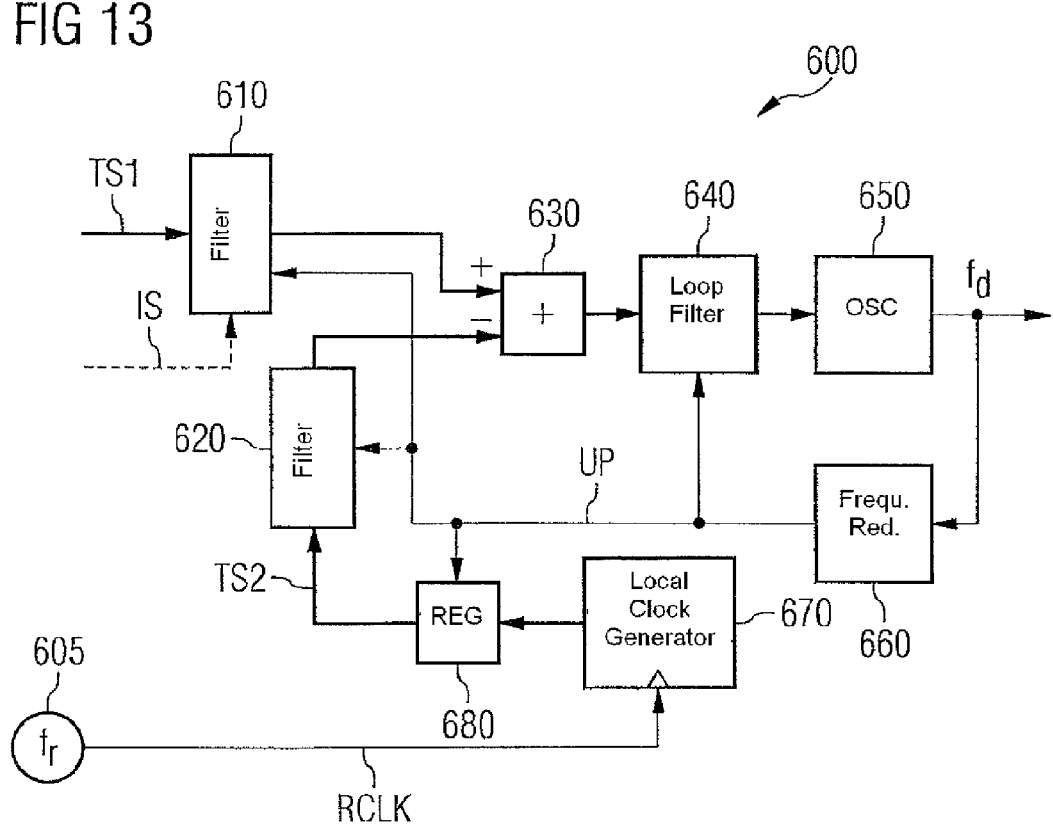
FIG. 13 schematically illustrates further details of the device as illustrated in FIG. 12.

FIG. 13 schematically illustrates the implementation of the device 600 according to an embodiment of the invention.

The device comprises a first high-pass type filter 610 to which the first timestamp signal TS1 and the indication signal IS, as explained in connection with FIG. 12, are supplied.

According to an embodiment, the first high-pass type filter 610 is a first order filter and has a transfer function of the type $H(z)=1-z^{-1}$.

The device 600 further comprises a loop filter 640, which may be a proportional-integral type filter, and a controlled oscillator 650. The reconstructed data clock is generated on the basis of the output clock signal of the controlled oscillator 650. In FIG. 13, the frequency of the reconstructed data clock is denoted by fd.

The device 600 further comprises a frequency reducer 660, which receives the reconstructed data clock and is configured to generate therefrom a clock signal having a reduced frequency. In particular, according to the illustrated embodiment, the frequency reducer 660 generates an update pulse signal UP.

The local timestamp generator 670 may be implemented on the basis of a counter. In particular, the generation of the local timestamps may be based on counting signal transitions in the reference clock signal RCLK.

The output signal of the local timestamp generator 670 is supplied to a register 680. The output signal of the register 680 forms a second timestamp signal TS2. The second timestamp signal TS2 is supplied to a second high-pass type filter 620. The second high-pass type filter 620 may have a similar configuration as the first high-pass type filter 610, i.e., may be a first order filter having a transfer function of the type $H(z)=1-z-1$.

The output signal of the second high-pass type filter 620, i.e., the filtered second timestamp signal TS2, is supplied to a combination stage 630 which is configured to generate a difference signal by subtracting the filtered second timestamp signal TS2 from the first filtered timestamp signal TS1. The difference signal is used as a basis for controlling the controlled oscillator 650, by supplying the difference signal as a control signal to the controlled oscillator 650 via the loop filter 640.

As illustrated, the first high-pass type filter 610, the second high-pass type filter 620, the loop filter 640 and the register 680 are updated on the basis of the update pulse signal UP.

Accordingly, the device 600 comprises a control loop for generating the reconstructed data clock, the control loop comprising a first high-pass type filter 610 for filtering the first timestamp signal TS1 and a second high-pass type filter 620 for filtering the second timestamp signal TS2. The first timestamp signal TS1 corresponds to a remote timestamp signal whereas the second timestamp signal corresponds to a local timestamp signal.

According to an embodiment, the first high-pass type filter 610 and/or the second high-pass type filter 620 may be implemented as first order filters having a transfer function of the type $H(z)=1-z-1$ in the following way: If in a sequence of filtered values the i-th value is denoted by FV(i) and in the sequence of input values of the filter the i-th value is denoted by V(i), the filtered value may be calculated according to:

$$FV(i+1)=V(i+1)-V(i).$$

Further, the filter may be configured to accomplish an overflow processing of its input values. That is to say, as the first timestamp signal TS1 and the second timestamp signal TS2 may be subject to an overflow, the filters may be configured to detect an overflow of their input signal and, in case of detecting an overflow, to modify the calculation of the filtered output signal according to: $FV(i+1)=V(i+1)+OV-V(i)$, wherein OV is the overflow threshold above which an overflow of the input signal of the filter occurs. As explained above in connection with FIG. 3, the overflow processing in the filter provides filter output signals which are not influenced by overflow events.

Figure 14:
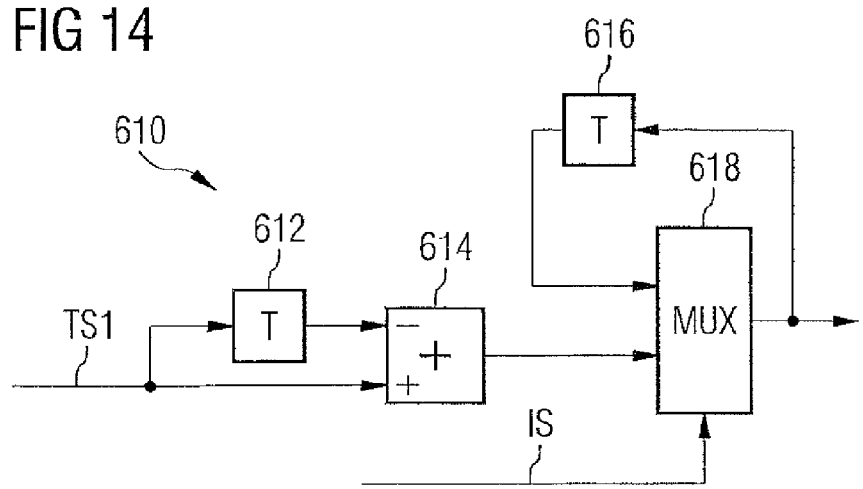
FIG. 14 schematically illustrates an implementation of a high-pass type filter according to an embodiment of the invention.

FIG. 14 schematically illustrates the implementation of the first high-pass type filter 610 according to an embodiment of the invention. In particular, FIG. 14 illustrates the use of the indication signal IS which is received from the control stage 520 for regulating the buffer size. It is to be noted that the above-mentioned overflow processing is not illustrated in FIG. 14.

As illustrated, the first high-pass type filter 610 comprises a register 612 which receives and stores the value of the input timestamp signal TS1. Further, the input timestamp signal TS1 is supplied to a combination stage 614. In the combination stage 614, a difference signal is generated by subtracting the stored value of the timestamp signal TS1 from the actual value of the timestamp signal TS1. This implements the above-mentioned calculation of the filtered value.

In addition, the first high-pass type filter 610 comprises a further register 616, and a multiplexer 618. The multiplexer 618 is controlled on the basis of the indication signal IS. A first input signal of the multiplexer 618 is formed by the difference signal generated by the combination stage 614, i.e., a signal representing the actual filtered value. A second input signal of the multiplexer 618 is formed by an output signal of the further register 616. The further register 616 is supplied at its input with the output signals of the first high-pass type filter 610. Accordingly, the further register 616 stores a previous value of the filter output signal.

Altogether, the above implementation of the first high-pass type filter 610 allows replacement of the present filtered value with a previous filtered value. The replacement is accomplished on the basis of the indication signals IS. According to the illustrated embodiment, the present filtered value is replaced by the previous filtered value if the buffer size is regulated by deleting or adding data packets. In this way, it can be avoided that the filtered signal is influenced by controlling the buffer size.

According to an embodiment, the above-mentioned operation of the filter may also be used in case of data packets which are lost in the packet switched network or discarded by the receiver, e.g., due to bit errors or due to an excessively large transit time through the packet switched network. That is to say, when data packets are missing in the jitter buffer 510, the control stage 520 generates the indication signal IS as well, which causes the first high-pass type filter 610 to replace the present filtered value with a previous one. Missing data packets may for example be detected on the basis of a sequence number of the data packets: If the last data packet which was output from the jitter buffer 510 has a sequence number i, and the next data packet which is available for output has a sequence number which is larger than i+1, a data packet was lost, and a corresponding indication signal is generated. In this case, the jitter buffer 510 and the control stage 520 also implement the functions of a packet loss detector. In other embodiments, a packet loss detector may be implemented in a different way.

Figure 15A:
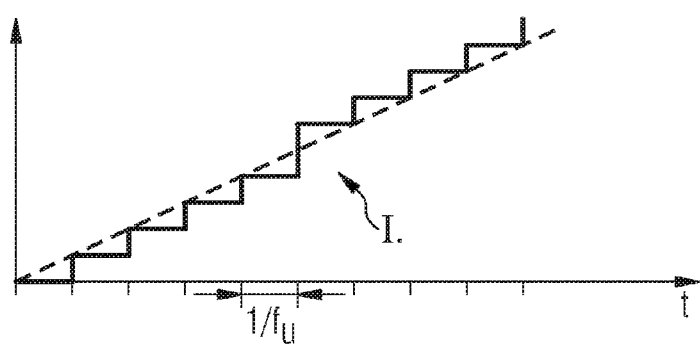
FIG. 15 schematically illustrates the course of a timestamp signal and of the corresponding filtered signal as used in a method of reconstructing a data clock according to an embodiment of the invention.
Figure 15B:
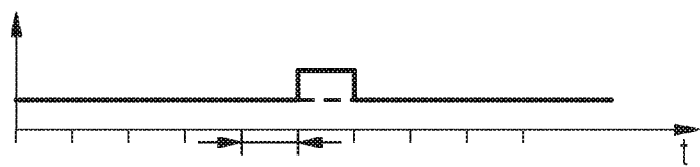

FIG. 15(*a*) schematically illustrates the course of the first timestamp signal TS1. For comparison, the dashed line illustrates the development of the local timestamps as generated by the local timestamp generator 670.

At position I., the buffer size is controlled by the control stage 520. In particular, a packet is deleted in the jitter buffer 510 so as to decrease the buffer size. This subsequently causes a larger increase in the first timestamp signal TS1, as one intermediate value of the timestamp signal TS1 is left out. As can be seen, this results in an offset between the first timestamp signal TS1 and the course timestamps as generated by the local timestamp generator 670.

In FIG. 15(*b*) the course of the filtered first timestamp signal is illustrated. As can be seen, control of the buffer size causes only a temporary variation in the filtered remote timestamp signal. Accordingly, there is no persistent change in the control signal of the controlled oscillator 650, and wander of the reconstructed data clock is avoided.

Further, a dashed line in FIG. 15(*b*) illustrates the course of the filtered remote timestamp signal when the present filtered value is replaced by a previous filtered value in case of controlling the buffer size. As can be seen, even a temporary change of the filtered remote timestamp signal can be avoided in this case.

It is to be understood that the above-explained exemplary configurations of devices for reconstructing a data clock from asynchronously transmitted data packets and corresponding methods are merely illustrative and can be modified and combined with each other as appropriate. For example, additional filters could be used. Moreover, the arrangement of components could be modified. For example, it would also be possible to provide the high-pass type filter in a different signal path of the control loop, e.g., at the output of the combination stage in the control loop, thereby requiring only one filter rather than separate filters in both the input signal path and the feedback signal path of the control loop. In addition, it is to be understood that the filters could be implemented digitally, by analog components or by a combination thereof. Also the use of registers for storing signal values and the schemes for updating the signal components could be modified as appropriate. Further, it is to be understood that the features of the above-described embodiments could be combined with each other as appropriate. For example, the replacement of filtered values with a previous filtered value to handle the loss of data packets as described in connection with FIG. 14 could also be used in connection with the embodiment of FIG. 1.

The devices and methods as described above may be implemented in communication apparatuses, such as line cards, modems or the like, e.g., in connection with an interworking function. For this purpose, certain or all of the described functions may be implemented by integrated circuits on the single semiconductor chip.

Finally, although the above-mentioned embodiments refer to TDM data which are transmitted via a packet switch network, it is to be understood that the invention is not limited thereto. Rather, the above-mentioned concepts may be applied wherever synchronous data are transmitted via asynchronous networks, for example in connection with video streaming or audio streaming applications or the like.

What is claimed is:

1. A method of reconstructing a data clock from asynchronously transmitted data packets, the method comprising:
   receiving the data packets containing data to be synchronously output on the basis of the data clock;
   generating an input signal of a control loop on the basis of the received data packets, the control loop generating the data clock;
   high-pass filtering the input signal at a signal input of the control loop;
   extracting a sequence number from the received data packets so as to generate a sequence number signal;
   high-pass type filtering of the sequence number signal; and
   generating a difference signal on the basis of the filtered sequence number signal.

2. The method according to claim 1, wherein high-pass filtering comprises a first order filtering.

3. The method according to claim 1, wherein high-pass filtering comprises a transfer function of the type $H(z)=1-z^{-1}$.

4. A method of reconstructing a data clock from asynchronously transmitted data packets, the method comprising:
   receiving the data packets containing data to be synchronously output on the basis of the data clock;
   generating a data reception progress signal on the basis of the received data packets;
   generating a data output progress signal on the basis of the data clock for the synchronous output of data;
   high-pass type filtering the data reception progress signal;
   high-pass type filtering the data output progress signal;
   extracting a sequence number from the received data packets so as to generate a sequence number signal;
   high-pass type filtering of the sequence number signal;
   generating a difference signal on the basis of the filtered sequence number signal;
   loop filtering the difference signal to produce a loop filtered difference signal;
   generating a control signal of a controlled oscillator on the basis of the loop filtered difference signal; and
   generating the data clock for the synchronous output of data on the basis of an output signal of the controlled oscillator.

5. The method according to claim 4, wherein the high-pass type filtering of at least one of the data reception progress signal and the data output progress signal is accomplished by a first order filter.

6. The method according to claim 4, wherein the high-pass type filtering of at least one of the data reception progress signal and the data output progress signal is accomplished with a filter transfer function of the type $H(z)=1-z^{-1}$.

7. The method according to claim 4, wherein the high-pass type filtering of at least one of the data reception progress signal and the data output progress signal comprises at least one of an overflow processing of the data reception progress signal and of the data output progress signal, respectively.

8. The method according to claim 4, wherein the high-pass type filtering of the sequence number signal is accomplished by a first order filter.

9. The method according to claim 4, wherein the high-pass type filtering of the sequence number signal is accomplished with a filter transfer function of the type $H(z)=1-z^{-1}$.

10. The method according to claim 4, wherein the high-pass type filtering of the sequence number signal comprises an overflow processing of the sequence number signal.

11. The method according to claim 4,
   wherein the filtered data reception progress signal and the filtered sequence number signal are multiplied so as to obtain a product signal, and
   wherein the difference signal is generated on the basis of the product signal.

12. The method according to claim 11,
   wherein the product signal is accumulated over frames of multiple received data packets so as to obtain an accumulated product signal, and
   wherein the difference signal is generated on the basis of the accumulated product signal.

13. A method of reconstructing a data clock from asynchronously transmitted data packets, the method comprising:
   receiving the data packets containing data to be synchronously output on the basis of the data clock;
   extracting remote timestamps from the received data packets so as to obtain a first timestamp signal;
   generating local timestamps on the basis of a local reference clock so as to obtain a second timestamp signal;
   high-pass type filtering of the first timestamp signal;

high-pass type filtering of the second timestamp signal;
extracting a sequence number from the received data packets so as to generate a sequence number signal;
high-pass type filtering of the sequence number signal; and
generating a difference signal on the basis of the filtered first timestamp signal and further on the basis of the filtered sequence number signal;
generating a control signal of a controlled oscillator on the basis of the difference signal;
generating the data clock for the synchronous output of data on the basis of an output signal of the controlled oscillator.

14. The method according to claim 13, wherein high-pass type filtering of at least one of the first timestamp signal and the second timestamp signal is accomplished by a first order filter.

15. The method according to claim 13, wherein high-pass type filtering of at least one of the first timestamp signal and the second timestamp signal is accomplished with a filter transfer function of the type $H(z)=1-z^{-1}$.

16. The method according to claim 13, wherein high-pass type filtering of at least one of the first timestamp signal and the second timestamp signal comprises an overflow processing of the first timestamp signal or the second timestamp signal, respectively.

17. The method according to claim 13, further comprising:
buffering the received data packets in a buffer; and
controlling a size of the buffer by adding or deleting data packets,
wherein in case of adding or deleting a data packet, a value of the filtered first timestamp signal is replaced with a previous value of the filtered first timestamp signal.

18. The method according to claim 13, further comprising:
detecting a loss of a data packet; and
upon detection of a loss of a data packet, replacing a value of the filtered first timestamp signal with a previous value of the first timestamp signal.

19. A device for reconstructing a data clock from asynchronously transmitted data packets, the device comprising:
a control loop comprising a controlled oscillator, the control loop being configured to receive, at a signal input, an input signal generated on the basis of received asynchronously transmitted data packets and to generate, on the basis of the input signal, the data clock for a synchronous output of data received via asynchronously transmitted data packets;
a first high-pass type filter provided at the signal input of the control loop to perform high-pass filtering of the input signal, the high-pass type filter coupled to an input of a loop filter of the control loop;
an extraction stage configured to extract a sequence number from the received asynchronously transmitted data packets and to generate a corresponding sequence number signal;
a second high-pass type filter configured to receive the sequence number signal and to output a filtered sequence number signal; and
a combination stage configured to generate a difference signal on the basis of the filtered sequence number signal.

20. The device according to claim 19, wherein the high-pass type filter comprises a first order filter.

21. The device according to claim 19, wherein the high-pass type filter has a transfer function of the type $H(z)=1-z^{-1}$.

22. The device according to claim 19, wherein the first high-pass type filter and/or the second high-pass type filter comprises a first order filter.

23. The device according to claim 19, wherein the first high-pass type filter and/or the second high-pass type filter has a transfer function of the type $H(z)=1-z^{-1}$.

24. The device according to claim 19, wherein the first high-pass type filter and/or the second high-pass type filter is configured to accomplish an overflow processing of the data reception progress signal or the data output progress signal, respectively.

25. The device according to claim 19, wherein the third high-pass type filter comprises a first order filter.

26. The device according to claim 19, wherein the third high-pass type filter has a transfer function of the type $H(z)=1-z^{-1}$.

27. The device according to claim 19, wherein the third high-pass type filter is configured to accomplish an overflow processing of the sequence number signal.

28. The device according to claim 27, further comprising:
a multiplication stage configured to receive the filtered data reception progress signal and the filtered sequence number signal and to output a product signal,
wherein the combination stage is configured to generate the difference signal on the basis of the product signal.

29. The device according to claim 28, further comprising:
an accumulator stage configured to accumulate the product signal over multiple received asynchronously transmitted data packets and to output an accumulated product signal,
wherein the combination stage is configured to generate the difference signal on the basis of the accumulated product signal.

30. A device for reconstructing a data clock from asynchronously transmitted data packets, the device comprising:
an extraction stage configured to extract remote timestamps from received asynchronously transmitted data packets containing data to be synchronously output on the basis of the data clock, and to output a first timestamp signal;
a controlled oscillator, the data clock being generated on the basis of an output signal of the controlled oscillator;
a local timestamp generator configured to generate local timestamps on the basis of a local reference clock signal so as to obtain a second timestamp signal;
a first high-pass type filter configured to receive the first timestamp signal and produce a filtered first timestamp signal;
a second high-pass type filter configured to receive the second timestamp signal and produce a filtered second timestamp signal;
a further extraction stage configured to extract a sequence number from the received asynchronously transmitted data packets and to generate a corresponding sequence number signal;
a third high-pass type filter configured to receive the sequence number signal and to output a filtered sequence number signal; and
a combination stage configured to generate a difference signal on the basis of the filtered first timestamp signal and further on the basis of the filtered sequence number signal,
wherein a control signal of the controlled oscillator is generated on the basis of the difference signal.

31. The device according to claim 30, wherein the first high-pass type filter and/or the second high-pass type filter comprises a first order filter.

32. The device according to claim 30, wherein the first high-pass type filter and/or the second high-pass type filter has a transfer function of the type $H(z)=1-z^{-1}$.

33. The device according to claim 30, wherein the first high-pass type filter and/or the second high-pass type filter is configured to accomplish an overflow processing of the first timestamp signal or of the second timestamp signal, respectively.

34. The device according to claim 30, further comprising:
a buffer configured to buffer the received asynchronously transmitted data packets; and
a control stage configured to control a size of the buffer by adding or deleting asynchronously transmitted data packets and to generate an indication signal in case of adding or deleting a data packet,
wherein the first high-pass type filter is configured to replace a value of the filtered first timestamp signal with a previous value of the filtered first timestamp signal on the basis of the indication signal.

35. The device according to claim 30, further comprising a packet loss detector configured to detect a loss of a data packet and to generate an indication signal in case of a loss of a data packet, wherein the first high-pass type filter is configured to replace a value of the filtered first timestamp signal with a previous value of the filtered first timestamp signal on the basis of the indication signal.

36. The method according to claim 1, further comprising providing a high-pass type filter in a feedback path of the control loop to perform high-pass filtering of a feedback signal of the control loop.

37. The device according to claim 19, further comprising a third high-pass type filter provided in a feedback path of the control loop configured to perform high-pass filtering of a feedback signal of the control loop.

38. A device for reconstructing a data clock from asynchronously transmitted data packets, the device comprising:
a control loop comprising a controlled oscillator, the control loop being configured to receive, at a signal input, an input signal generated on the basis of received asynchronously transmitted data packets and to generate, on the basis of the input signal, the data clock for a synchronous output of data received via the asynchronously transmitted data packets; and
a high-pass type filter provided in a feedback path of the control loop to perform high-pass filtering a feedback signal of the control loop, the high-pass filter coupled to an input of a loop filter of the control loop;
an extraction stage configured to extract a sequence number from the received asynchronously transmitted data packets and to generate a corresponding sequence number signal;
a third high-pass type filter configured to receive the sequence number signal and to output a filtered sequence number signal; and
a combination stage configured to generate a difference signal on the basis of the filtered sequence number signal.

39. A method of reconstructing a data clock from asynchronously transmitted data packets, the method comprising:
receiving the data packets containing data to be synchronously output on the basis of the data clock;
generating a data reception progress signal on the basis of the received data packets;
generating a sequence number signal by extracting the sequence number from the received data packets;
generating a data output progress signal on the basis of the data clock for the synchronous output of data;
high-pass type filtering the data reception progress signal;
high-pass type filtering the sequence number signal;
high-pass type filtering the data output progress signal;
generating a difference signal on the basis of the filtered data reception progress signal and the filtered data output progress signal and further on the basis of the filtered sequence number signal;
loop filtering the difference signal to produce a loop filtered difference signal;
generating a control signal of a controlled oscillator on the basis of the loop filtered difference signal; and
generating the data clock for the synchronous output of data on the basis of an output signal of the controlled oscillator.

40. A device for reconstructing a data clock from asynchronously transmitted data packets, the device comprising:
a first counter configured to generate a data reception progress signal on the basis of received asynchronously transmitted data packets containing data to be synchronously output on the basis of the data clock;
a controlled oscillator, the data clock being derivable from an output signal of the controlled oscillator;
a second counter configured to generate a data output progress signal on the basis of the data clock;
an extraction stage configured to extract a sequence number from the received asynchronously transmitted data packets and to generate a corresponding sequence number signal;
a first high-pass type filter configured to receive the data reception progress signal and to output a filtered data reception progress signal;
a second high-pass type filter configured to receive the data output progress signal and to output a filtered data output progress signal;
a third high-pass type filter configured to receive the sequence number signal and to output a filtered sequence number signal;
a combination stage configured to generate a difference signal on the basis of the filtered data reception progress signal and the filtered data output progress signal, wherein the combination stage is configured to generate the difference signal further on the basis of the filtered sequence number signal; and
a loop filter configured to generate a filtered difference signal on the basis of the difference signal from the combination stage, wherein a control signal of the controlled oscillator is generated on the basis of the filtered difference signal.

* * * * *